M. M. SORENSEN.
TYPE WRITER ATTACHMENT.
APPLICATION FILED JAN. 31, 1917. RENEWED OCT. 8, 1918.

1,286,820.

Patented Dec. 3, 1918.

WITNESSES
William P. Goebel

INVENTOR
Minnie M. Sorensen
BY
ATTORNEYS

UNITED STATES PATENT OFFICE.

MINNIE M. SORENSEN, OF CHICAGO, ILLINOIS.

TYPE-WRITER ATTACHMENT.

1,286,820.  Specification of Letters Patent.  Patented Dec. 3, 1918.

Application filed January 31, 1917, Serial No. 145,641. Renewed October 8, 1918. Serial No. 257,411.

*To all whom it may concern:*

Be it known that I, MINNIE M. SORENSEN, a subject of the King of Denmark, and a resident of Chicago, in the county of Cook and State of Illinois, have invented a new and Improved Type-Writer Attachment, of which the following is a full, clear, and exact description.

My invention relates to a basket that can be quickly and easily secured to a typewriting machine.

An object of the invention is to provide a basket for presenting envelops in close proximity to the feed rollers of a typewriting machine and to provide space in the same basket for receiving the addressed envelops.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1:
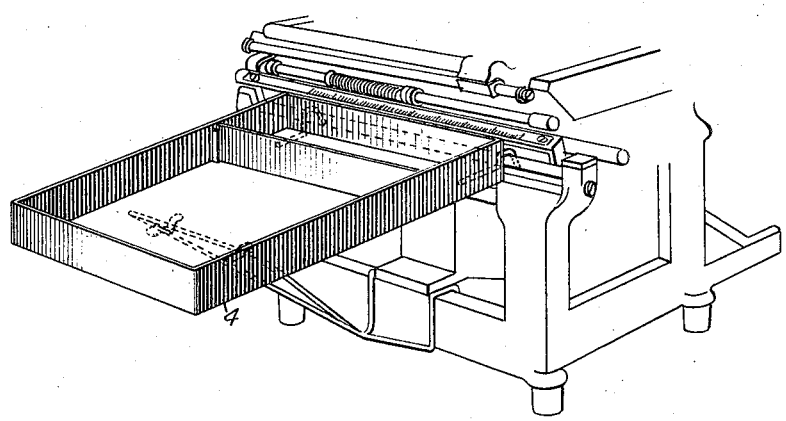
Fig. 1 is a perspective elevation of the attachment when secured to a typewriting machine.
Figure 2:
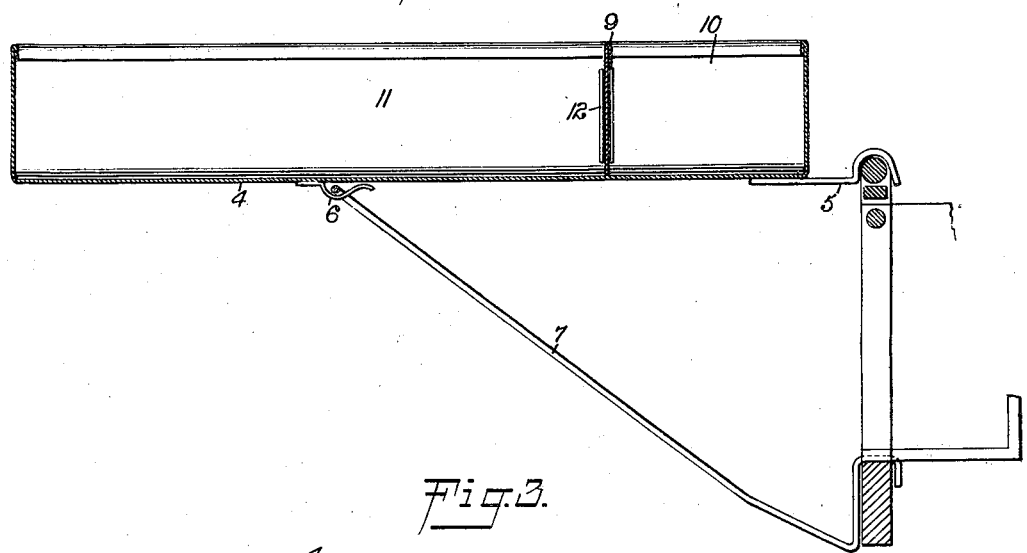
Fig. 2 is a longitudinal cross section through the attachment as secured.
Figure 3:
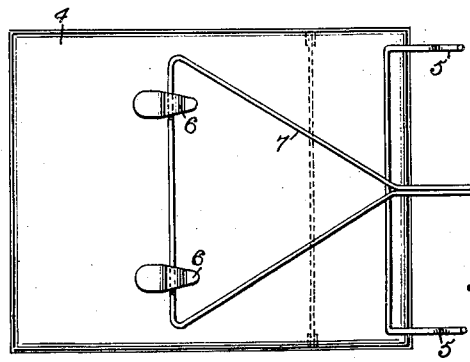
Fig. 3 is a bottom plan view.

Referring to the drawings, 4 is a basket of any suitable size and material. The basket has a pair of hooks 5 projecting from the bottom thereof at one end of the basket whereby the basket can be hooked on one of the bars provided in the rear of the typewriter. A pair of spring clips 6 are also secured to the bottom of the basket near the other end of the basket. A bracket 7 made of wire is slipped between the clips 6 and serves to support the basket substantially in a horizontal position in the rear of the machine, the bracket 7 having suitable hooks 8 for engaging the frame of the machine whereat the bracket abuts in supporting the basket.

A removable partition 9 is provided within the basket near the end of the basket in proximity to the machine whereby a compartment 10 is formed for envelops to be addressed and a compartment 11 for receiving the addressed envelops. In this way, when the typist has addressed an envelop, she will move her hand toward the basket to throw the envelop into compartment 11, and on the return will pick up an envelop from compartment 10 to place it between the feed rolls of the typewriter.

The side walls of the basket have suitable guides 12 for the partition which facilitate the removing and placing of the partition, for the partition is removed when the basket is used for filling in letters.

I claim:

1. A typewriter attachment of the class described comprising a basket having hooks at one end thereof whereby it may be secured to a typewriter machine, yielding clips associated with the bottom of the basket, a bracket adapted to be secured to the typewriter and engage said clips whereby the basket is supported in a substantially horizontal position, and a partition nearer to the end of the basket in proximity to the machine dividing the basket into two compartments, one for envelops to be addressed and the other for addressed envelops.

2. A typewriter attachment of the class described comprising a paper basket having hooks at one end thereof for engaging the rear part of a typewriting machine near the top thereof, yielding clips on the bottom of the basket, a bracket adapted to detachably engage the clips and the rear of the typewriting machine, said bracket forming an abutment for the basket and maintaining the same in a substantially horizontal position relative to the typewriting machine, and a removable partition adapted to be disposed transversely of the paper basket near the end of the basket in proximity of the machine, said partition dividing the basket into two compartments, substantially as and for the purpose set forth.

MINNIE M. SORENSEN.